United States Patent [19]

Dotson et al.

[11] Patent Number: 5,062,966

[45] Date of Patent: Nov. 5, 1991

[54] PROCESS FOR DECOMPOSING SOLUTIONS OF HYDROXYLAMMONIUM SALTS

[75] Inventors: Ronald L. Dotson; Sanders H. Moore, both of Cleveland, Tenn.

[73] Assignee: Olin Corporation, Cheshire, Conn.

[21] Appl. No.: 608,416

[22] Filed: Nov. 2, 1990

[51] Int. Cl.$^5$ .............................. C02F 1/58; C02F 1/76
[52] U.S. Cl. ..................................... 210/753; 210/754; 210/755; 210/756; 210/903
[58] Field of Search ........................ 210/743, 753–756, 210/757, 758, 903

[56] References Cited

U.S. PATENT DOCUMENTS

| | | | |
|---|---|---|---|
| 3,732,164 | 5/1973 | Pressley et al. | 210/756 |
| 4,056,469 | 11/1977 | Eichenhofer et al. | 210/756 |
| 4,137,166 | 1/1979 | Heimberger et al. | 210/756 |

*Primary Examiner*—Thomas Wyse
*Attorney, Agent, or Firm*—James B. Haglind; Paul Weinstein

[57] ABSTRACT

A process for decomposing a solution of a hydroxylammonium compound includes raising the pH of the solution to about 8 or higher and reacting the alkaline solution with a source of hypohalite ions. The process decomposes solutions of hydroxylammonium salts in a manner which produces benign liquid and gas effluents which can be readily disposed of or discharged.

24 Claims, No Drawings

PROCESS FOR DECOMPOSING SOLUTIONS OF HYDROXYLAMMONIUM SALTS

This in vention was made with Government suPPort under Contract No. DAAA15-89-C-0011 awarded by the Department of Army. The Government has certain rights in this invention.

BACKGROUND OF THE INVENTION

The present invention relates to the decomposition of solutions of hydroxylammonium salts. More particularly, the present invention relates to the decomposition of solutions of hydroxylammonium salts using a source of hypohalite ions.

Salts of hydroxylamine and their solutions are of great industrial importance as intermediates, particularly in the production of caprolactam. Further, hydroxylammonium nitrate is employed in the purification of plutonium metal, as one component of a liquid propellant and as a reducing agent in photographic applications.

Solutions of hydroxylamine and its salts which are generated, for example, as effluents require treatment prior to discharge or disposal.

Ullman s Encyclopedia of Industrial Chemistry reports that hydroxylammonium salts decompose on heating, and runaway exothermic decomposition can take place as a result of local heating. Decomposition is also promoted by heavy metal impurities, particularly, copper, copper-containing alloys and copper salts. The decomposition products of the hydroxylammonium sulfate are sulfur dioxide, dinitrogen monoxide (nitrous oxide), water and ammonium sulfate; the chloride decomposes to hydrogen chloride, nitrogen, water and ammonium chloride. Hydroxylammonium salts react with alkali to give the easily decomposed hydroxylamine. With nitrites, decomposition to dinitrogen monoxide occurs. Aqueous solutions of hydroxylammonium salts are acidic and heating for long periods at 80° C. leads to slow decomposition. Solutions of hydroxylamine and its salts are radical traps, whereby ammonia and nitrogen are formed. Oxidation of hydroxylammonium salts leads, depending on the oxidant and reaction conditions, to nitrogen compounds in various oxidation states. Strong reducing agents such as zinc or iron powder form ammonia. (5th Rev.ed. Vol.A13, 528, 1989).

U.S. Pat. No. 4,927,542 issued to H. Fuchs et al on May 22, 1990, teaches a process for eliminating hydroxylammonium salts from acidic solutions by the use of manganese (IV) oxides.

The above process, however, introduces undesirable metal ions into the solutions and requires several treatment steps to achieve decomposition to where the effluent can be discharged or disposed of safely, for example, in a navigable waterway.

BRIEF DESCRIPTION OF THE INVENTION

It is an object of the invention to provide a process for decomposing hydroxylammonium salts which produces benign liquid and gas effluents which can be readily disposed of or discharged.

Another object of the invention is to provide a process for decomposing solutions of hydroxylammonium salts at plant sites or in the field which is rapid while producing innocuous by-products.

These and other objects of the invention are accomplished in a process for decomposing a solution of a hydroxylammonium salt which comprises raising the pH of the solution to a pH of about 8 or greater and reacting the solution with a source of hypohalite ion.

DETAILED DESCRIPTION OF THE INVENTION

Hydroxylammonium salts which can be treated by the process of the invention include hydroxylammonium sulfate, hydroxylammonium chloride, hydroxylammonium phosphate, and hydroxylammonium nitrate among others. As the solutions of each of these salts is acidic, it is necessary to raise the pH of the solutions to where the treatment with the source of hypohalite ion will be effective. This can be accomplished by raising the pH to about 8 or higher, preferably to or above about 10, and more preferably, at a pH of from about 12 or higher.

In one embodiment of the invention, acidic solutions of hydroxylammonium salts are treated with basic compounds such as the carbonates or hydroxides of alkali metal or alkaline earth metals, with alkali metal carbonates and hydroxides being preferred because of their increased solubility in aqueous solutions. The basic compound may be added to the acidic hydroxylammonium salt solution in any amount or concentration which will raise the pH of the hydroxylammonium salts solution to 8 or above.

Suitable as a source of hypohalite ions are compounds which provide hypochlorite ions, hypobromite ions, hypoiodite ions and mixtures thereof when dissolved in water. These include liquid, solid and gaseous inorganic compounds such as alkali metal or alkaline earth metal salts, including sodium hypochlorite, potassium hypochlorite, lithium hypochlorite, lithium hypobromite, dibasic magnesium hypochlorite, calcium hypochlorite and calcium hypobromite tetrahydrate. Also suitable are alkaline aqueous solutions of hypohalous acids such as hypochlorous acid, hypobromous acid and hypoiodous acid which can be prepared, for example, by the addition of chlorine, bromine, and iodine, respectively, to water. Hypochlorous acid can also be prepared by several other known methods.

Organic compounds which may be used as a source of hypohalite ions include N-chloro organic nitrogen compounds such as chloroisocyanurate compounds i.e. trichloroisocyanuric acid and alkali metal salts of dichloroisocyanuric acid, as well as chlorinated dimethyl o hydantoin, and chloramine-T and the like. Similarly, N-bromo organic nitrogen compounds including tribromocyanuric acid, alkali metal salts of dibromoisocyanuric acid, and brominated hydantoins such as dibromo dimethyl hydantoin and chloro bromo dimethyl hydantoin In addition mixtures of chloramine-T and alkali metal bromides or iodides may be employed. Preferred embodiments of the source of hypohalite ion are those which supply hypochlorite ions, with inorganic compounds such as alkali metal hypochlorites and calcium hypochlorite being more preferred.

In an alternate embodiment of the invention, the decomposition of the hydroxylammonium salts in solution is accomplished by the addition of a basic source of hypohalite ions. Suitable as basic sources of the hypochlorite ion are, for example, dibasic calcium hypochlorite, hemibasic calcium hypochlorite and monobasic sodium hypochlorite [Na(OCl)NaOH] and mixtures thereof. Similarly compositions having a core of a hypochlorite or hypobromite compound and coated with an alkaline salt may provide a basic source of hypohalite ions. Suitable compositions are taught in U.S. Pat. No. 3,793,216 issued Feb. 19, 1974 to G. R. Dychdala; and U.S. Pat. No. 4,048,351 issued Sept. 13, 1977 to W. C. Saeman and N. N. Coe. The use of these basic materials provides a single step process for making the acidic hydroxylammonium solutions alkaline while decomposing the hydroxylammonium salts.

In the case of a "spill" of the acidic hydroxylammonium salt solution, the pH of the hydroxylammonium salt solution is raised to above about 12 and a sufficient amount of the source of hypohalite ion added to completely decompose the hydroxylammonium salt.

In a preferred embodiment, the source of hypohalite ion is added in increments to the solution of hydroxylammonium salts and the solution is agitated during the addition and the subsequent decomposition reactions. The source of hypohalite ion, preferably in solution form, is introduced below the surface of the solution of a hydroxylammonium salt and dispersed through the hydroxylammonium salt solution by the agitation means or any other suitable method of dispersion to assure complete mixing.

The reaction between the source of hypohalite ion and the hydroxylammonium salt is instantaneous. Using the reaction of hydroxylammonium nitrate with sodium hypochlorite as an example, the products of the reaction are believed to be illustrated by the following equations:

$$(NH_3OH)NO_3 + NaOCl \rightarrow NH_2OCl + H_2O + NaNO_3 \quad (1)$$

$$NH_2OCl \rightarrow \tfrac{1}{2}N_2 + \tfrac{1}{2}Cl_2 + H_2O \quad (2)$$

$$\tfrac{1}{2}Cl_2 + NaOH \rightarrow \tfrac{1}{2}NaOCl + \tfrac{1}{2}NaCl + H_2O \quad (3)$$

$$2(NH_3OH)NO_3 + NaOCl + 2NaOH \rightarrow 5H_2O + NaCl + N_2 + 2NaNO_3 \quad (4)$$

It is also believed that concurrently additional reactions occur and these are believed to be illustrated by the following equations:

$$(NH_3OH)NO_3 + OH^- \rightarrow NH_2OH + H_2O + NO_3^- \quad (5)$$

$$7NH_2OH \rightarrow 4N_2O + N_2 + 4HNO_3 + 12H_2O \quad (6)$$

The reactions illustrated by equations (5) and (6) are believed not to take place in the absence of the hypohalite ion.

The amount of the hypohalite ion source used is that which provides a molar ratio of hypohalite to hydroxylammonium salt of from about 0.5 to about 3, and preferably from about 1 to about 2.

While the reactions of the process are exothermic, cooling is not normally required as the heat developed facilitates the release of gases from the reaction mixture. The novel process of the present invention is easily controlled as the rate of reaction is directly dependent on the rate of addition of the source of hypohalite ions. The treated solution can be discharged or disposed of by known methods.

In order to exemplify the process of the invention, the following examples are provided without an intent to limit the scope of the instant invention to the discussion therein. Unless otherwise indicated, all parts and percentages are by weight.

EXAMPLE 1

A solution of 2.47 molar hydroxylammonium nitrate (HAN)(200 ml) was added to a reactor equipped with a stirrer. To the solution was added 30 mls of 50% NaOH. The solution briefly had a milky appearence and the pH was 12.2 After 0 addition of the NaOH, the concentration of hydroxylammonium nitrate had been reduced to 1.88m. Sodium hypochlorite (200 ml, 10% by wt. NaOCl) was added to the reactor. White foam briefly filled the reactor which immediately returned to normal. Four increments of 25 mls each were added to the reactor over a period of about 10 minutes. Some foaming occurred during the addition of each of the first three increments. The concentration of HAN was measured after each addition of NaOCl by acid-base titration. After the final addition, hydroxylammonium nitrate could not be detected. The pH of the treated solution was 8.44 and an excess of NaOCl to HAN of 0.57% was used. The results are given in Table I below.

EXAMPLE 2

A solution of hydroxylammonium nitrate (HAN)(100 ml, 2.60 molar) was added to a reactor equipped with a stirrer. To the solution was added 30 mls of 50% NaOH to raise th pH to >12. Sodium hypochlorite (11.06% by wt. NaOCl) was injected with a syringe below the surface of the hydroxylammonium nitrate solution in ten increments until a total of 100 mls had been added. After each injection the concentration of hydroxylammonium nitrate was determined and the moles of NaOCl which had been added calculated. The results are recorded in Table I below. This example shows that the addition of NaOCl in small increments permits the use of molar ratios of NaOCl to hydroxylammonium nitrate of substantially less than 1 to be used to Completely decompose the hydroxylammonium nitrate.

EXAMPLE 3

The injection method of Example 1 was used to feed a 0.15% solution of NaOCl in two increments of 50 mls each after the hydroxylammonium nitrate (100 mls, 0.28 m) had been made alkaline by the addition of 20 ml of 50% NaOH. The results are reported in Table I below.

EXAMPLE 4

The injection method of Example 2 was employed to introduce 100 mls. of 10.15% NaOCl solution under the surface of 100 mls. of a solution of hydroxylammonium nitrate (0.26m) made alkaline by the addition of 20 mls. of 50% NaOH. The results are included in Table I below.

EXAMPLE 5

A solution of 100 mls. of hydroxylammonium nitrate made alkaline by the addition of 20 mls. of 50% NaOH. Into the alkaline hydroxylammonium nitrate solution was intooduced 100 mls. of 10.15% NaOCl in 5 injections of 20 mls. each. Table I below records the results of the decomposition reaction.

EXAMPLE 6

To 20 mls of hydroxylammonium nitrate was added 20 mls. of 50% NaOH. Into this alkaline solution was continuously injected 200 mls. of 10.15% NaOCl solution. The decomposition results are given in Table I below.

TABLE 1

HYDROXYLAMMONIUM NITRATE DECOMPOSITION WITH SODIUM HYPOCHLORITE

| | Example 1 | | Example 2 | | Example 3 | |
|---|---|---|---|---|---|---|
| | Moles HAN | Moles NaOCl | Moles HAN | Moles NaOCl | Moles HAN | Moles NaOCl |
| Initial | 0.2470 | 0.000 | 0.2600 | 0.0000 | 0.24 | 0.000 |
| | 0.0260 | 0.312 | 0.2290 | 0.0150 | | 0.078 |
| | 0.0130 | 0.351 | 0.2230 | 0.0312 | 0.02 | 0.156 |
| | 0.0090 | 0.390 | 0.1600 | 0.0468 | | |
| | 0.0013 | 0.429 | 0.1250 | 0.0620 | | |
| | 0.0000 | 0.468 | 0.0970 | 0.0780 | | |
| | | | 0.0750 | 0.0930 | | |
| | | | 0.0450 | 0.1090 | | |
| | | | 0.0220 | 0.1240 | | |
| | | | 0.0003 | 0.1400 | | |
| | | | 0.0000 | 0.1480 | | |

| | Example 4 | | Example 5 | | Example 6 | |
|---|---|---|---|---|---|---|
| | Moles HAN | Moles NaOCl | Moles HAN | Moles NaOCl | Moles HAN | Moles NaOCl |
| Initial | 0.240 | 0.000 | 0.240 | 0.0000 | 0.480 | 0.000 |
| | 0.026 | 0.156 | | 0.0312 | 0.035 | 0.312 |
| | | | | 0.0624 | | |
| | | | | 0.0936 | | |
| | | | | 0.1248 | | |
| | | | 0.017 | 0.1560 | | |

EXAMPLE 7

A solution of hypochlorous acid (10 mls, 48% by weight of HOCl) was added to a graduate. Water was added to increase the volume to 100 mls and to this solution was added 20 mls of 50% NaOH. This solution was injected under the surface of the hydroxylammonium nitrate in 10 ml increments. The concentration of the hydroxylammonium nitrate solution was determined after each addition and the concentration of the HOCl calculated. After two additions (0.146 moles of HOCl), the molar concentration of hydroxylammonium nitrate was 0.008 m.

What is claimed is:

1. A process for decomposing an aqueous solution of a hydroxylammonium compound which comprises raising the pH of the solution to about 8 or higher and reacting the alkaline solution with a source of hypohalite ions.

2. The process of claim 1 in which the source of hypohalite ions is selected from the group consisting of hypochlorite ions, hypobromite ions, hypoiodite ions, and mixtures thereof.

3. The process of claim 1 in which the hydroxylammonium compound is selected from the group consisting of hydroxylammonium chloride, hydroxylammonium sulfate, hydroxylammonium nitrate. and hydroxylammonium phosphate.

4. The process of claim 1 in which the pH of the solution is raised by the addition of an alkali metal hydroxide or an alkali metal carbonate.

5. The process of claim 4 in which the pH of the solution of hydroxylammonium compound is raised to about 10 or higher.

6. The process of claim 1 in which the source of hypohalite ions is an inorganic compound selected from the group consisting of alkali metal hypochlorites, alkaline earth metal hypochlorites, alkali metal hypobromites, alkaline earth metal hypobromites, and mixtures thereof 7. The process of claim 1 in which the source of hypohalite ions is an alkaline solution of a hypohalous acid.

8. The process of claim 1 in which the source of hypohalite ions is an N-chloro organic nitrogen compound or an N-bromo organic nitrogen compound 9. The process of claim 1 in which the molar ratio of hypohalite ions to hydroxylammonium compound is from about 0.5 to about 3.

10. A process for decomposing a solution of hydroxylammonium nitrate which comprises admixing an alkaline compound to raise the pH to about 8 or higher and reacting the alkaline solution with a source of hypohalite ions.

11. The process of claim 10 in which the source of hypohalite ions is selected from the group consisting of hypochlorite ions, hypobromite ions, hypoiodite ions, and mixtures thereof.

12. The process of claim 10 in which the pH of the solution is raised by the addition of an alkali metal hydroxide or an alkali metal carbonate.

13. The process of claim 10 in which the source of hypohalite ions is an inorganic compound selected from the group consisting of alkali metal hypochlorites, alkaline earth metal hypochlorites, alkali metal hypobromites, alkaline earth metal hypobromites, and mixtures thereof.

14. The process of claim 10 in which the source of hypohalite ions is an alkaline solution of a hypohalous acid.

15. The process of claim 10 in which the source of hypohalite ions is an N-chloro organic nitrogen compound or an N-bromo organic nitrogen compound 16. The process of claim 10 in which the molar ratio of hypohalite ions to hydroxylammonium compound is from about 0.5 to about 3.

17. The process of claim 16 in which the pH of the solution of hydroxylammonium compound is raised to about 10 or higher.

18. The process of claim 17 in which the source of hypohalite ions is an alkali metal hypochlorite, an alkaline earth metal hypochlorite, and mixtures thereof.

19. The process of claim 18 in which the source of hypohalite ions is an alkali metal hypochlorite.

20. The process of claim 18 in which the source of hypohalite ions is sodium hypochlorite.

21. The process of claim 18 in which the source of hypohalite ions is an alkaline solution of hypochlorous acid.

22. A process for decomposing acidic solutions of hydroxylammonium compounds which comprises reacting the acidic solution with an alkaline source of hypochlorite ion.

23. The process of claim 22 in which the alkaline source of hypochlorite ion is a basic hypochlorite compound.

24. A process for decomposing a solution of a hydroxylammonium compound which comprises raising the pH of the solution at about 8 or higher and introducing an aqueous solution containing hypohalite ions below the surface of the solution of hydroxylammonium compound

* * * * *